US006100963A

United States Patent [19]
Hosaka

[11] Patent Number: 6,100,963
[45] Date of Patent: Aug. 8, 2000

[54] ORIGINAL-COVER CLOSER

[75] Inventor: Hiroaki Hosaka, Kanagawa, Japan

[73] Assignee: Katoh Electrical Machinery Co., Ltd., Kanagawa, Japan

[21] Appl. No.: 09/201,249

[22] Filed: Nov. 30, 1998

[30] Foreign Application Priority Data

Dec. 25, 1997 [JP] Japan ..................................... 9-357734

[51] Int. Cl.$^7$ ................................................. G03B 27/62
[52] U.S. Cl. ............................................... 355/75; 355/76
[58] Field of Search ................................ 355/53, 72, 75, 355/76, 23–25; 271/265.01, 272; 399/380

[56] References Cited

U.S. PATENT DOCUMENTS

| | | | |
|---|---|---|---|
| 4,439,036 | 3/1984 | Davis et al. | 355/75 |
| 4,588,290 | 5/1986 | Ohtsuka | 355/76 |
| 5,261,634 | 11/1993 | Nakamura | 248/441.1 |
| 5,541,712 | 7/1996 | Fujitaka et al. | 355/231 |
| 5,621,501 | 4/1997 | Matsuo et al. | 355/75 |
| 5,915,691 | 6/1999 | Deguchi et al. | 271/265.01 |

*Primary Examiner*—Safet Metjahic
*Assistant Examiner*—Hung Henry Nguyen
*Attorney, Agent, or Firm*—Notaro & Michalos P.C.

[57] ABSTRACT

An original-cover closer has: a mounting or base member to be installed on the body of a copying machine; a supporting member pivoted at side plates thereof by a first hinge pin to side plates of the mounting member and on which an original cover is supported and; a lifting member mounted at side plates thereof by a second hinge pin on the supporting member at free ends of the side plates thereof to be pivotable in an opposite direction to the direction in which the support member is opened and closed and to which the original cover is to be fixed. A control pin is provided between the side plates of the lifting member and near but off the second hinge pin and the closer further includes; an original-cover weight bearing pin provided between the side plates of the mounting member and near but off the first hinge pin; a first spring receiving member engaged on or pivoted to the control pin; a second spring receiving member engaged or pivoted on the control pin and assembled telescopically with the first spring receiving member; an elastic member and provided between the second and first spring receiving members to force the supporting member in the opening direction of the original cover and also the lifting member in a direction in which the lifting member overlaps the supporting member. Cuts or guide slots are formed in the side plates of the supporting member to allow the control pin to move about the second hinge pin as the lifting member is pivoted, thereby covering horizontally the top of even a thick original placed on a contact glass cover.

5 Claims, 6 Drawing Sheets

ORIGINAL-COVER CLOSER

BACKGROUND OF THE INVENTION

1. Field of the Invention

The present invention relates to an original-cover closer suitable for use with an original cover of a duplicator, copier, printing machine or the like (will be referred to as "copying machine" hereinunder) to open and close the original cover in relation to an original placed on a contact glass of the copying machine.

2. Description of the Prior Art

Of the original-cover closers having been proposed so far, a typical one comprises a mounting or base member to be installed on the body of a copying machine, a supporting member pivoted by a first hinge pin to the mounting member and on which an original cover of the copying machine is supported, a lifting member mounted by a second hinge pin to a free end of the supporting member to be pivotable in an opposite direction to the turning direction of the supporting member and to which the original cover is fixed, and an elastic member provided between the mounting and supporting members to elastically force the supporting member in the opening direction of the original cover.

In addition, another original-cover closer of the above type is also known which is adapted to allow the elastic member to act on a controlling member installed on the lifting member in order to turn the supporting member in the opening direction of the original cover while controlling the reverse turning of the lifting member. In this example, the acting point of the elastic member and the controlling member are not engaged on, or coupled to, each other so that when the lifting member is turned reversely, the acting point of the controlling member will slide on the elastic member while pressing down the latter, or the elastic member will not act in any other direction and will thus be expanded or compressed in a same direction as the direction in which the supporting member is opened or closed. More particularly, in the conventional original-cover closers, the lifting member includes two side plates between and in which a horizontally extending control pin is rotatably supported as a controlling member in a position off the position at which the side plates of the lifting member are pivoted to side plates of the supporting member. Thus the acting point of the elastic member is allowed to act on the control pin. Otherwise, guide slots are formed in the side plates of the supporting member in a position off the position at which the side plates of the lifting member are pivoted to the side plates of the supporting member. The control pin is supported movably in the guide slots and engaged on an engagement projection provided off the pivoted point of the lifting member.

In the former original-cover closer, when the lifting member is turned reversely, the control pin slides on the top of a slider provided over the elastic member to expand and compress the elastic member in a direction in which the elastic force of the elastic member acts on the supporting member. In the latter original-cover closer, as the lifting member is turned reversely, the control pin pressed by the engagement projection is guided in the guide slots to thus expand or compress the elastic member in a direction in which the elastic force of the elastic member will act on the supporting member. That is to say, in both these conventional original-cover closers, the acting direction of the elastic member will not change even when the lifting member is turned reversely.

In the above conventional original-cover closers, when the lifting member is turned reversely, the elastic member is expanded or compressed in a direction in which the supporting member is opened or closed. These conventional original-cover closers adapted such that the slider acting on the elastic member and a cam member abutting the slider provided over the mounting member are used to control the opening and closing operations of the original cover, are advantageous in that the elastic member will not sway when the lifting member is turned reversely, and thus the acting direction of the elastic member will not change. However, such a construction of the original-cover closers will not always be necessary for a original-cover closer which uses no such slider and cam member.

SUMMARY OF THE INVENTION

The present invention has an object to provide an original-cover closer using no slider and cam member destined to control the operating torque of the supporting member and which is designed to securely retain the original cover on a thick original such as a book.

The above object can be achieved by providing an original-cover closer comprising:

a mounting or base member to be installed on the body of a copying machine;

a supporting member pivoted at side plates thereof by a first hinge pin to side plates of the mounting member and on which an original cover is supported;

a lifting member mounted at side plates thereof by a second hinge pin on the supporting member at free ends of the side plates thereof to be pivotable in an opposite direction to the direction in which the support member is opened and closed and to which the original cover is to be fixed;

a control pin provided between the side plates of the lifting member and near but off the second hinge pin;

an original-cover weight bearing pin provided between the side plates of the mounting member and near but off the first hinge pin;

a first spring receiving member engaged on or pivoted to the control pin;

a second spring receiving member engaged or pivoted on the control pin and assembled telescopically with the first spring receiving member;

an elastic member provided between the second and first spring receiving members to force the supporting member in the opening direction of the original cover and also the lifting member in a direction in which the lifting member overlaps the supporting member; and cuts or guide slots formed in the side plates of the supporting member to allow the control pin to move about the second hinge pin as the lifting member is pivoted, thereby covering horizontally the top of even a thick original placed on a contact glass cover.

According to the present invention, the second spring receiving member may be a spring case in which the first spring receiving member is received along with the elastic member.

According to the present invention, the first and second spring receiving members are assembled to be a telescopic tube and the elastic member is wounded on and between the first and second spring receiving members.

According to the present invention, the first and second spring receiving members and the elastic member are housed together in a spring case.

The above object can also be achieved by providing an original-cover closer comprising:

a mounting member to be installed on the body of a copying machine;

an original-cover supporting member pivoted at side plates thereof by a first hinge pin to side plates of the mounting member;

a lifting member mounted at side plates hereof by a second hinge pin on the supporting member at free ends of the side plates thereof to be pivotable in an opposite direction as the direction in which the support member is opened and closed, and to which the original cover is to be fixed;

a control pin provided between the side plates of the lifting member and near but off the second hinge pin;

an original-cover weight bearing pin provided between the side plates of the mounting member and near but off the first hinge pin;

a first spring receiving member rockably born at a part thereof on the cover weight bearing pin;

a spring case in which the first spring receiving member is rockably born at a part thereof on the cover weight bearing pin;

an elastic member provided between the spring case and first spring receiving member to force the supporting member in the opening direction of the original cover and also the lifting member in a direction in which the lifting member overlaps the supporting member; and guide slots formed in the side plates of the supporting member to allow the lifting member to move, thereby covering horizontally the top of even a thick original placed on a contact glass cover.

BRIEF DESCRIPTION OF THE DRAWINGS

These objects and other objects, features, aspects and advantages of the present invention will become more apparent from the following detailed description of the present invention when taken in conjunction with the accompanying drawings, of which.

DETAILED DESCRIPTION OF THE PREFERRED EMBODIMENTS

Figure 1:
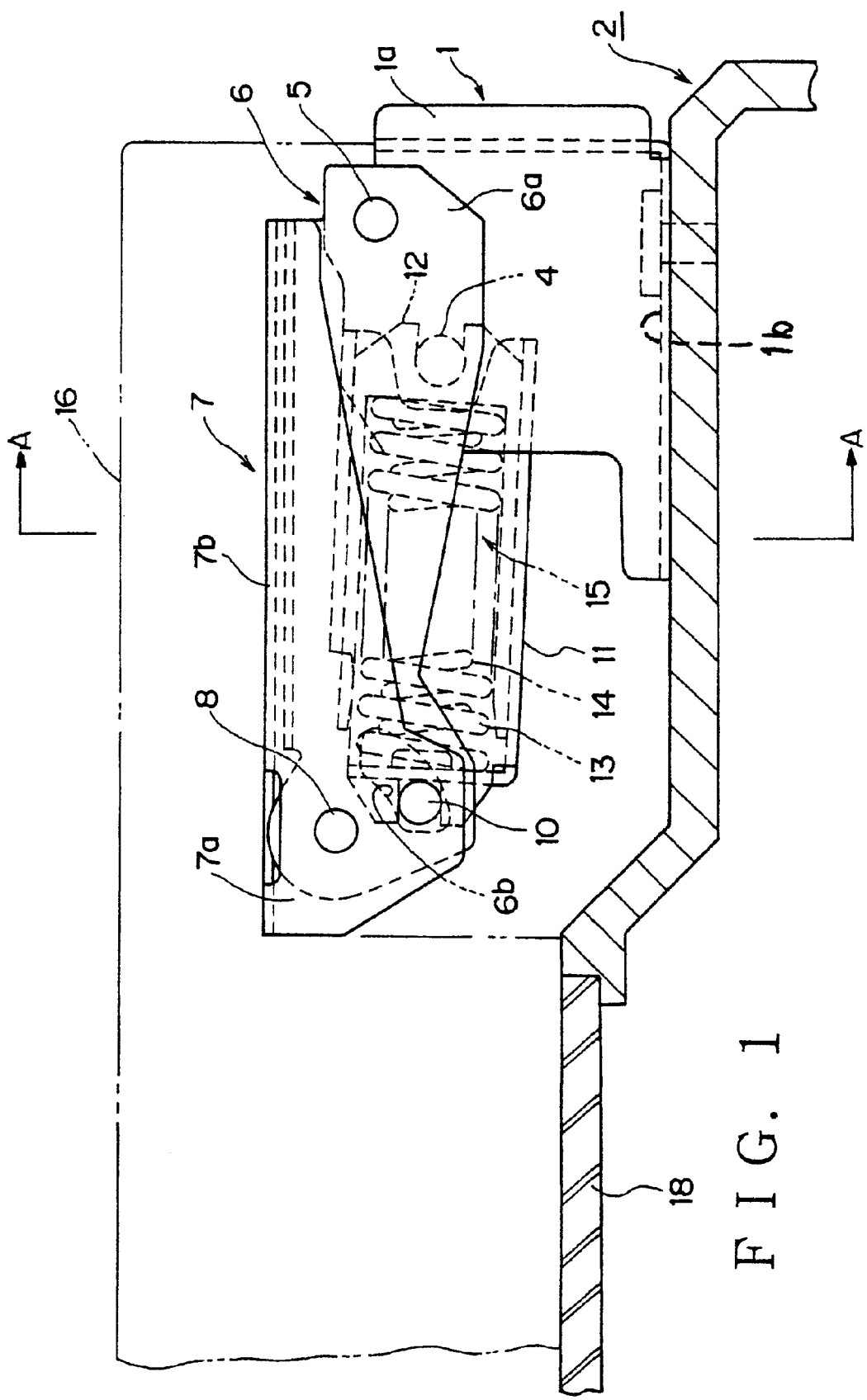
FIG. 1 is a partially sectional, fragmentary side elevation of the original-cover closer of the present invention, installed on a copying machine body.
Figure 2:
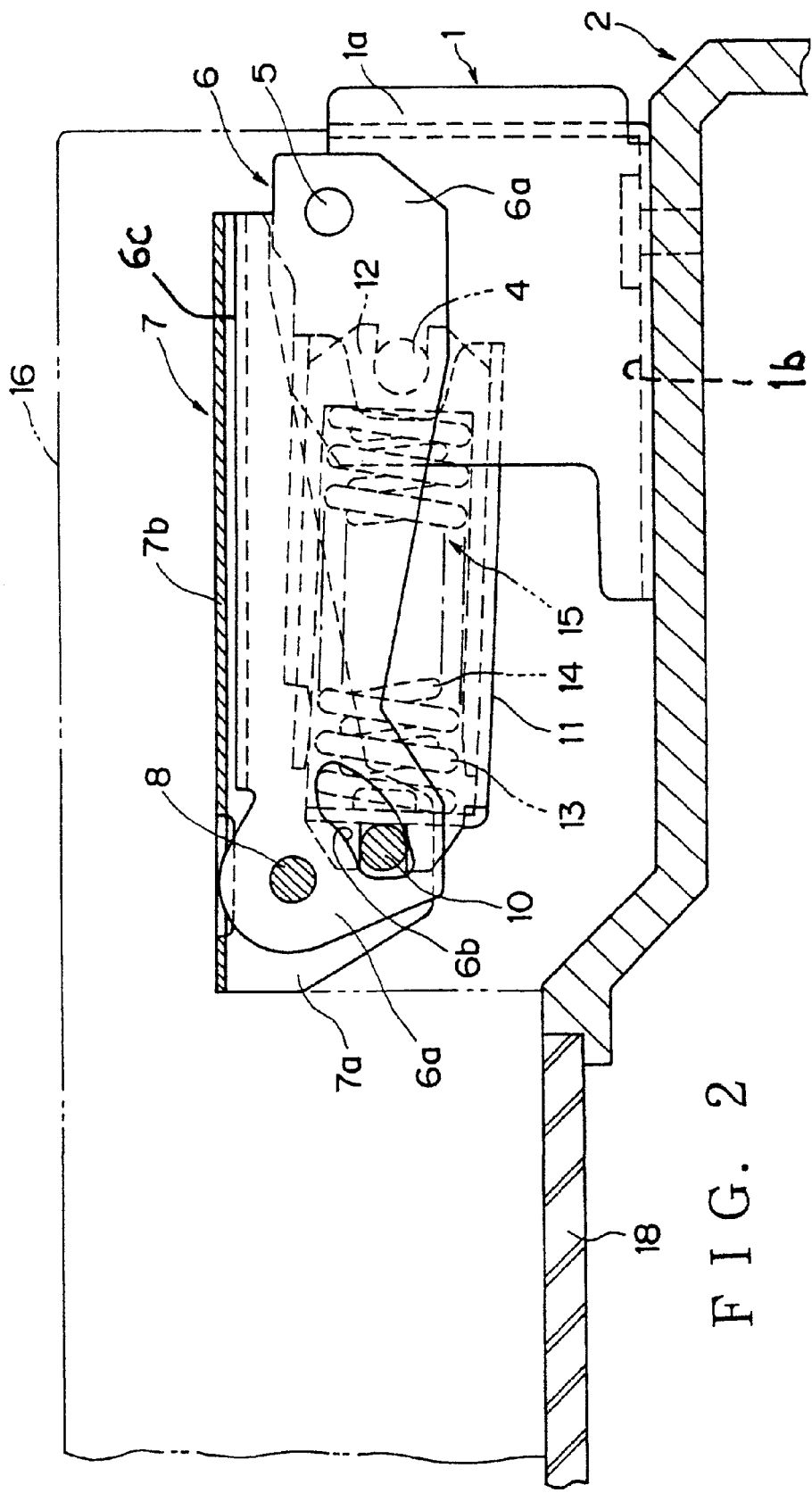
FIG. 2 is a partially sectional, fragmentary side elevation of the original-cover closer in FIG. 1, taken along the axis of the side plate of the lifting member.
Figure 3:
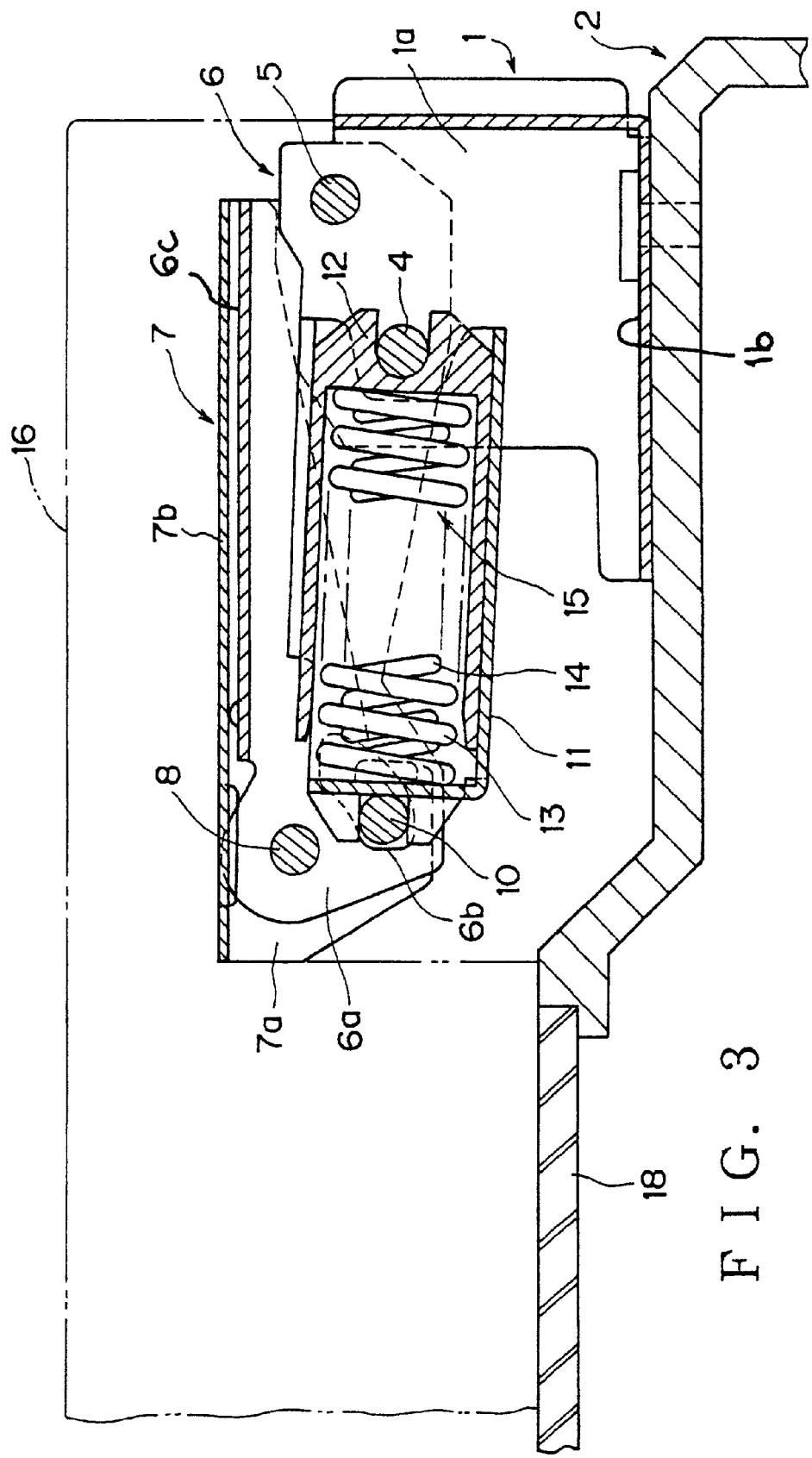
FIG. 3 is a partially sectional, fragmentary side elevation of the original-cover closer in FIG. 2, taken along the axis of the elastic member.
Figure 4:
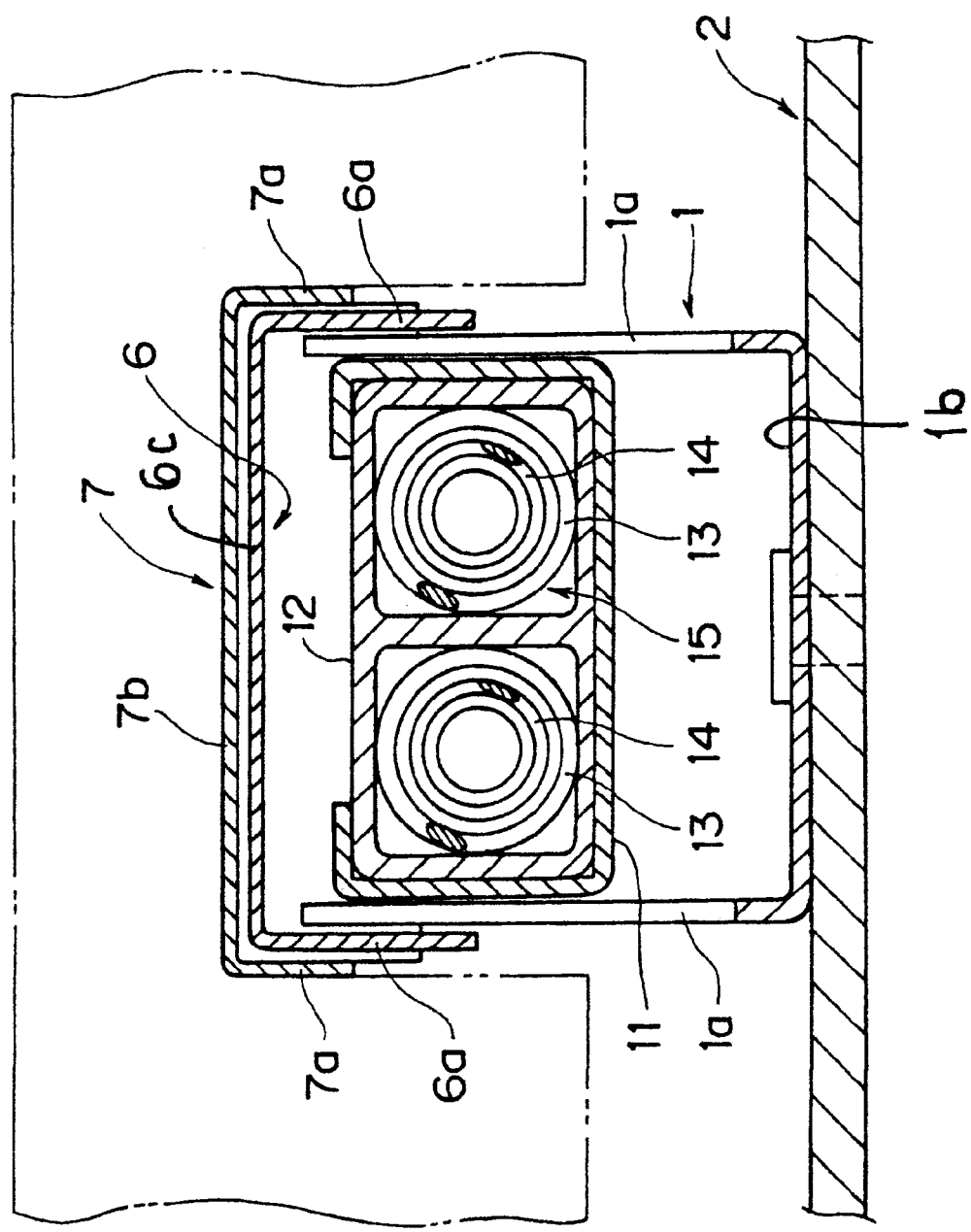
FIG. 4 is a sectional view taken along the line A—A in FIG. 1.

Referring now to FIGS. 1 to 4, there is illustrated one embodiment of the original-cover closer according to the present invention. The original-cover closer (will be referred to simply as "closer" hereinunder) comprises a mounting member 1 fixed to the top rear end portion of a copying machine body 2. The mounting member 1 includes two side plates extending upwardly from opposite sides of a base plate a 1b; There are provided between the opposite side plates 1a an original-over weight bearing pin 4 and a first hinge pin 5, offset from each other and both extending horizontally. The bearing or support pin 4 and first hinge pin 5 are pivotally born in their respective bearing holes formed in the side plates 1a. The closer further comprises a supporting member 6 including two side plates 6a extending downwardly from opposite sides of an upper plate 6c. The side plates 6a are pivotally mounted at base ends thereof on the first hinge pint 5.

Note that both the side plates 6a of the supporting member 6 may be pivoted to the first hinge pin 5 born in both the side plates 1a of the mounting member 1 to be rotatable as the supporting member 6 is turned.

The closer also comprises a lifting member 7 including a two side plates 7a extending downwardly from opposite sides of a support plate 7b. The lifting member 7 is pivoted at both the side plates 7a thereof by a second hinge pin 8 to the free end of the supporting member 6 to be pivotable in an opposite direction to the direction in which the supporting member 6 is opened and closed.

A control pin 10, extending through a curved elongated hole 6b formed in each of the side plates 6a of the supporting member 6, is rotatably installed in a position off the position where the side plates 7a of the lifting member 7 are pivoted by the second hinge pin 8 to the supporting member 6. Note that the curved elongated hole 6b forming cuts or guide slots may be a simple cut.

The closer further comprises a spring case 11 pivotally installed at the upper end thereof on the control pin 10 and placed inside the supporting member 6. The spring case 11 is a second spring receiving member encasing and retaining slidably a first spring receiving member 12 supported rockably at the lower end thereof on the cover weight bearing pin 4. An elastic member 15 consisting of two sets of double coil spring, large and small, 13 and 14, is provided between the first spring receiving member 12 and the spring case 11 being the second spring receiving member. Note that the elastic member 15 is not limited to the two sets of double coil springs 13 and 14 as in this embodiment but may use a single set or three sets of such a double coil spring. Also any coil spring other than the double one may be used, such as a single or triple coil spring, for example. An original cover 16 indicated with an imaginary line is fixed at the rear end thereof.

Also note that the first and spring receiving members 12 and 11 may be formed as a telescopic tube. In this case, the coil springs of the elastic member 15 are fitted on the telescopic tube and between the cover weight bearing pin 4 and control pin 10. The above-mentioned spring case 11 may be used as a first spring receiving member while the above-mentioned first spring receiving member 12 may be used as a second spring receiving member. Also the first and second spring receiving members may be swapped between them. The closer constructed as having been described in the foregoing functions as will be described below:

The control pin 10 forces the lifting member 7 in a direction in which it will overlap the supporting member 6 and thus the elastic force of the member 15 is transmitted to the supporting member 6 via the control pin 10. When the original cover 16 is opened from a closed position, the supporting member 6 is turned along with the original cover 16. At this time, the elastic force of the member 15 forcing the supporting member 6 via the control pin 10 in a direction to open the original cover 16 (clockwise in the plane of the drawing), allows the original cover 16 to be opened lightly. The original cover 16 is stopped at an angle of 30° to 35° to which the original cover 16 is opened most frequently, and stably held there.

At this time, the weight of the original cover 16 forces the lifting member 7 to turn reversely (counterclockwise in the plane on the drawing). However, the elastic force of the member 15, conveyed via the control pin 10, will force the lifting member 8 to turn in an opposite direction to the reverse turn thereof. Thus, the lifting member 6 stops and stably hold the original cover 16 in the opened position with no such reverse turning.

Thereafter, the original cover 16 can be stopped and stably held in any opened position.

Figure 5:
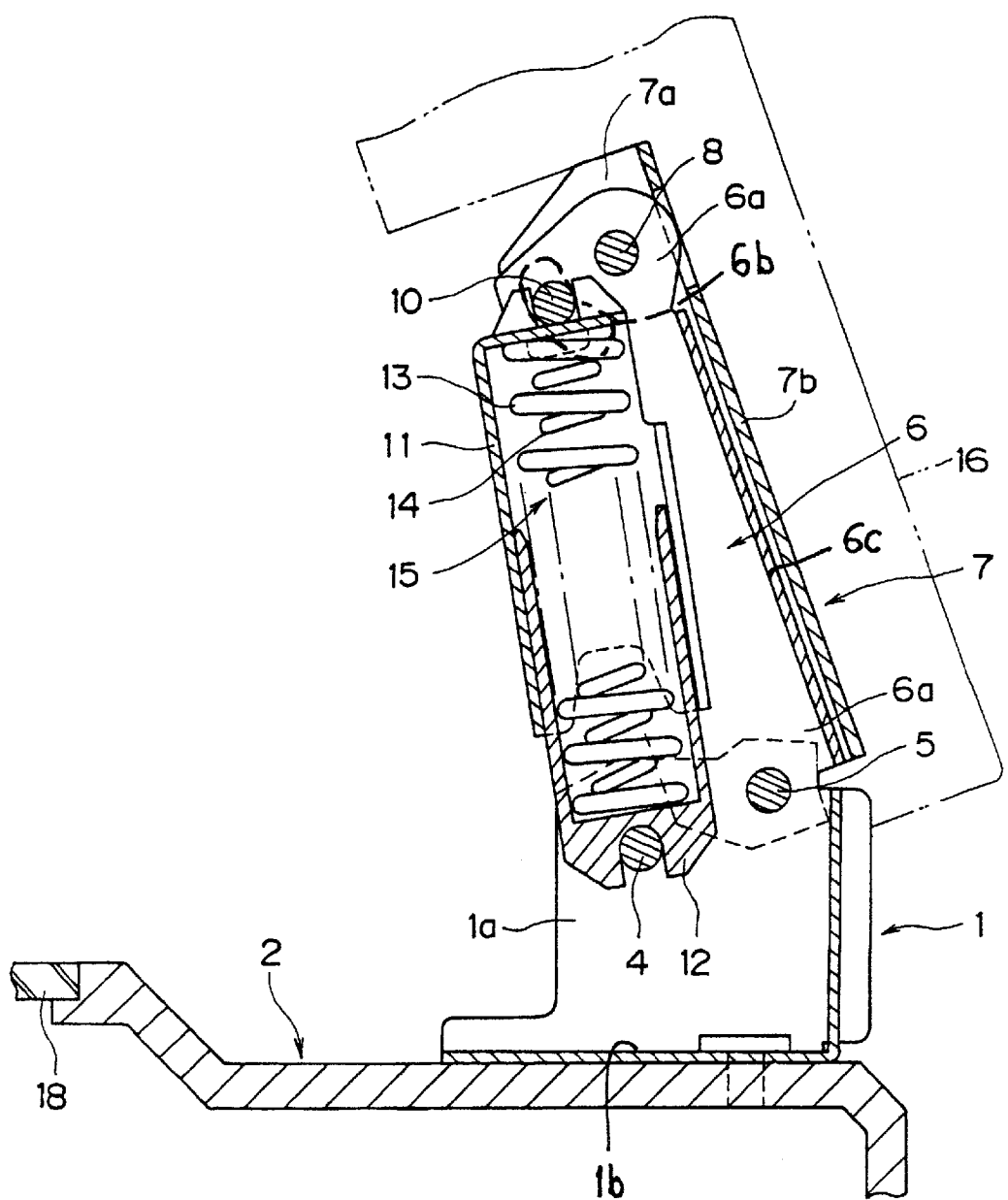
FIG. 5 is a partially sectional, fragmentary side elevation of the original-cover closer in FIG. 3, the closer being opened to an intermediate angle of opening (70°)

Also the elastic force of the elastic member 15 acting on the control pin 10 allows the original cover 16 to be closed without being turned reversely, as shown in FIG. 5.

Figure 6:
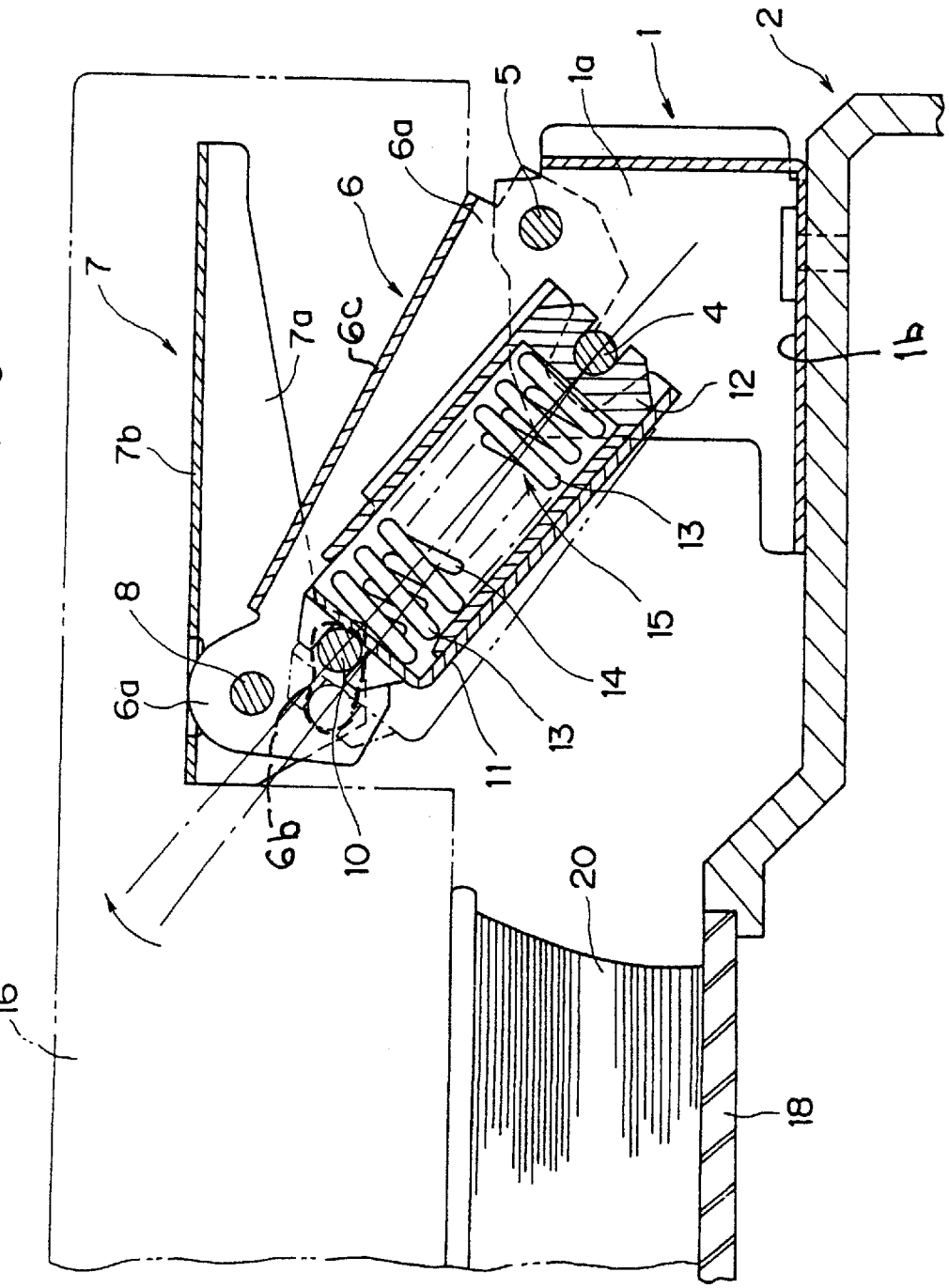
FIG. 6 is a partially sectional, fragmentary side elevation of the original-cover closer in FIG. 3, the lifting member being turned reversely to horizontally cover the top of a thick original with the closer opened to an intermediate angle of opening (30°).

Assume here that a thick original 20 like a book is placed on a contact glass 18 as shown in FIG. 6. When the original cover 16 is closed until the bottom face thereof touches the top of the thick original 20 and depressed slightly forcibly at a front portion thereof a little off the original 20, the lifting member 7 can be turned reversely about the second hinge pin 8 against the elastic force of the member 15 acting on the control pin 10 so that the original cover 16 will cover the top of the thick original 20 substantially horizontally as shown in FIG. 6. At this time, the elongated holes cuts or guide slots 6b allow the control pin 10 to move about the second hinge pin 8. The elongated holes cuts or guide slots 6b may be simple cuts as previously mentioned.

The control pin 10 moving about the second hinge pin 8 along with the lifting member 7 will oscillate the spring case 11 supported thereon along with the elastic member 15 and first spring receiving member 12 in a direction of arrow in FIG. 6.

What is claimed is:

1. An original-cover closer comprising:
    a mounting member having a base plate to be installed on a body of a copying machine, and two side plates extending upwardly from opposite sides of the base plate;
    a supporting member having an upper plate and two side plates extending downwardly from opposite sides of the upper plate, one end of each side plate of the supporting member being located outside a corresponding side plate of the mounting member and being pivotably connected thereto via a first hinge pin;
    a lifting member having a support plate to which one end of an original cover of the copy machine is attached, and two side plates extending downwardly from opposite sides of the support plate, one end of each side plate of the lifting member being located outside a free end of a corresponding side plate of the supporting member and being pivotably connected thereto via a second hinge pin;
    a first spring receiving member engaged with a weight bearing pin fixed to the side plates of the mounting member at a position near to but offset from the first hinge pin;
    a second spring receiving member engaged with a control pin fixed to the side plates of the lifting member at a position near to but offset from the second hinge pin;
    a compression spring between the second and first spring receiving members for forcing the supporting member in an opening direction of the original cover and also the lifting member in a direction in which the lifting member overlaps the supporting member; and
    cuts or guide slots formed in the side plates of the supporting member for allowing the control pin to be received in the cuts or slots when the lifting member is turned to cover a top of a thick original placed on a contact glass cover horizontally by the original cover.

2. The original-cover closer as set forth in claim 1, wherein the second spring receiving member is a spring case in which the first spring receiving member is received along with the elastic member.

3. The original-cover closer as set forth in claim 1, wherein the first and second spring receiving members are assembled to be a telescopic tube and the compression spring is wounded on and between the first and second spring receiving members.

4. The original-cover closer as set forth in claim 1, wherein the first and second spring receiving members and the compression spring are housed together in a spring case.

5. An original-cover closer comprising:
    a mounting member having a base plate to be installed on a body of a copying machine, and two side plates extending upwardly from opposite sides of the base plate;
    a supporting member having an upper plate and two side plates extending downwardly from opposite sides of the upper plate, one end of each side plate of the supporting member being located outside a corresponding side plate of the mounting member and being pivotably connected thereto via a first hinge pin;
    a lifting member having a support plate to which one end of an original cover of the copying machine is attached, and two side plates extending downwardly from opposite sides of the support plate, one end of each side plate of the lifting member being located outside a free end of a corresponding side plate of the supporting member and being pivotably connected thereto via a second hinge pin;
    a tubular first spring receiving member, one end of which is pivotably supported by a weight bearing pin fixed to the side plates of the mounting member at a position near to but offset from the first hinge pin;
    a spring case pivotably engaged with a control pin fixed to the side plates of the lifting member at a position near to but offset from the second binge pin, the spring case slidably accommodating the first spring receiving member;
    a compression spring accommodated within the first spring receiving member and disposed between the first spring receiving member and the spring case to force the supporting member in an opening direction of the original cover and also the lifting member in a direction in which the lifting member overlaps the supporting member; and
    cuts or guide slots formed in the side plates of the supporting member to allow the control pin to be received in the cuts or slots when the lifting member is turned to cover a top of a thick original placed on a contact glass cover horizontally by the original cover.

* * * * *